United States Patent [19]

Takahashi et al.

[11] Patent Number: 5,278,671
[45] Date of Patent: Jan. 11, 1994

[54] IMAGE PROCESSING APPARATUS WITH CORRECTION OF DIFFUSION ERRORS OF OVERLAPPING DOTS

[75] Inventors: Yasuhiko Takahashi; Akira Higashide; Hiroto Yamada, all of Tokyo, Japan

[73] Assignee: Nippon Steel Corporation, Tokyo, Japan

[21] Appl. No.: 770,053

[22] Filed: Oct. 4, 1991

[30] Foreign Application Priority Data

Oct. 5, 1990 [JP] Japan ................... 2-267753

[51] Int. Cl.$^5$ ................... H04N 1/21; H04N 1/40
[52] U.S. Cl. ................... 358/456; 358/458; 358/459; 358/465
[58] Field of Search ............... 358/456, 458, 459, 298, 358/461, 455, 465, 466

[56] References Cited

U.S. PATENT DOCUMENTS 5,087,981 2/1992 Ng et al. ................... 358/459

FOREIGN PATENT DOCUMENTS

| | | |
|---|---|---|
| 62-242473 | 10/1987 | Japan . |
| 63-214073 | 9/1988 | Japan . |
| 63-217768 | 9/1988 | Japan . |
| 63-288567 | 11/1988 | Japan . |
| 1-97066 | 4/1989 | Japan . |
| 1115272 | 5/1989 | Japan . |

Primary Examiner—Edward L. Coles, Sr.
Assistant Examiner—Scott A. Rogers
Attorney, Agent, or Firm—Pollock, Vande Sande & Priddy

[57] ABSTRACT

An image processing apparatus in which, when a multi-tone image is printed by using an error diffusion technique, error data to be diffused is modified so that the tone level of the image data as printed varies linearly with variation of an input image data. A printed dot of a pixel has a larger area than that of the theoretical pixel so that the dot juts out into adjacent pixels. The error data to be diffused is modified in consideration of jut-out dot areas of adjacent pixels, so as to obtain a linear variation of the tone-level with variation of the input image data.

7 Claims, 8 Drawing Sheets

| A<br>15 | B<br>183 | C<br>105 |
|---|---|---|
| D<br>110 | E<br>190 | F<br>100 |
| G<br>50 | H<br>95 | I<br>42 |

FIG. 2B
PRIOR ART

| A<br>○<br>(15) | B<br>189<br>→ 6 | C |
|---|---|---|
| D<br>4.5<br>114.5 | E<br>4.5 | F |
| G | H | I |

B=183+6=189    ERROR = −66
D=110+4.5=114.5    ERROR = 114.5

FIG. 2C
PRIOR ART

| A<br>○ | B<br>●<br>(−66) | C<br>78.6<br>−26.4 |
|---|---|---|
| D<br>○<br>(114.5) | 4.5 E<br>−19.8<br>−45.8 | −19.8 F |
| G 34.4 | 34.4 H | I |

C=105−26.4=78.6 ERROR = 78.6

FIG. 2D
PRIOR ART

| A<br>○ | B<br>● | C<br>○<br>(78.6) |
|---|---|---|
| D<br>○ | E<br>220.5 | −19.8 F<br>23.6 |
| G | H | I |

| A ○ | B ● | C 7.8.6 |
|---|---|---|
| D ○ (114.5) | E ● (-34.5) | F 90 ←-13.8 |
| G 34.4 84.4 | H 34.4 -10.4 | I -10.4 |

| A ○ | B ● | C ○ |
|---|---|---|
| D ○ | E ● | F ○ (90) |
| G ○ (84.4) | H 152.8 ←33.8 | I 27 |

| A ○ | B ● | C ○ |
|---|---|---|
| D ○ | E ● | F ○ (90) |
| G ○ | H ● (-102.2) | I -10.4 27 ←-40.9 |

| A ○ | B ● | C ○ |
|---|---|---|
| D ○ | E ● | F ○ |
| G ○ | H ● | I ○ (17.7) |

| E D C B A | S | | |
|---|---|---|---|
| | $r < L$ | $L \leq r < \frac{\sqrt{5}}{2}L$ | $r \geq \frac{\sqrt{5}}{2}L$ |
| 0 0 0 0 0 | 0 | 0 | 0 |
| 0 0 0 0 1 | a | a | a |
| 0 0 0 1 0 | b | b | b |
| 0 0 0 1 1 | b | b | b |
| 0 0 1 0 0 | a | a | a |
| 0 0 1 0 1 | 2a | 2a | 2a−d |
| 0 0 1 1 0 | b | b | b |
| 0 0 1 1 1 | b | b | b |
| 0 1 0 0 0 | b | b | b |
| 0 1 0 0 1 | b | b | b |
| 0 1 0 1 0 | 2b−c | 2b−c | 2b−c |
| 0 1 0 1 1 | 2b−c | 2b−c | 2b−c |
| 0 1 1 0 0 | a+b | a+b | a+b−e |
| 0 1 1 0 1 | a+b | a+b | a+b−e |
| 0 1 1 1 0 | 2b−c | 2b−c | 2b−c |
| 0 1 1 1 1 | 2b−c | 2b−c | 2b−c |
| 1 0 0 0 0 | 2a+2b | 2a+2b | 2a+2b |
| 1 0 0 0 1 | a+2b−c | a+2b+c | a+2b−c |
| 1 0 0 1 0 | 2b−3c | 2b−3c | 2b−3c |
| 1 0 0 1 1 | −a+b | −a+b | −a+b |
| 1 0 1 0 0 | b−c | b−c | b−c |
| 1 0 1 0 1 | 2b−3c | 2b−3c+f | b−c |
| 1 0 1 1 0 | −a+b | −a+b | −a+b |
| 1 0 1 1 1 | b−c | b−c | b−c |
| 1 1 0 0 0 | b | b | b |
| 1 1 0 0 1 | a+b−c | a+b−c | a+b−c |
| 1 1 0 1 0 | 0 | 0 | 0 |
| 1 1 0 1 1 | 0 | 0 | 0 |
| 1 1 1 0 0 | −a+b−c | −a+b−c | −a+b−c+e |
| 1 1 1 0 1 | b−2c | b−2c+f | 0 |
| 1 1 1 1 0 | 0 | 0 | 0 |
| 1 1 1 1 1 | 0 | 0 | 0 |

IMAGE PROCESSING APPARATUS WITH CORRECTION OF DIFFUSION ERRORS OF OVERLAPPING DOTS

BACKGROUND OF THE INVENTION

1. Field of the Invention

This invention relates to an image processing apparatus which expresses an image according to generation and non-generation of dots and more particularly to an image processing apparatus which expresses an image approximately in tones by controlling generation of dots based on a multi-tone image signal.

2. Description of the Prior Art

There is widely used a technique of image expression in which an input image signal is converted into a binary signal and dots are generated in accordance with the binary signal. In this case, intermediate tones are expressed by degree of density of generated (shaded) dots. Regarding a method of binary-coding the image signal for the reproduction of intermediate tones of the input image, attention is recently drawn to the error diffusion technique, as disclosed in Japanese Patent unexamined Publications JP-A-62-242473, JP-A-63-288567, JP-A-63-217768, JP-A-63-214073, JP-A-1-97066, and JP-A-1-115272.

The error diffusion technique is intended to calculate the difference of concentration between the input image and output image on a pixel-by-pixel basis, and the resulting error component is diffused with specific weights to adjacent pixels.

In a case that a pixel of the input image, which is generally square, needs to be expressed by a dot of other shape (e.g. for example, circle), the dot is generally dimensioned to include the corresponding pixel completely. In consequence, when such a dot is generated for a certain pixel, the dot should overlap with an adjacent pixel.

The overlap of dots affects the density of the output image. For example, when a white dot (actually no dot) is printed next to a black dot, the white dot has its area reduced due to the jut-out area of the black dot, resulting in a blackish tone of this portion. Similarly, when a black dot is printed next to a white dot, the black dot juts out into the white dot area, resulting in a blackish tone of this portion. The binary-coding process based on the conventional error diffusion technique is incapable of correcting the influence of dot overlap on the density of the output image.

SUMMARY OF THE INVENTION

The present invention is aimed at overcoming the foregoing prior art deficiency, and its prime object is to provide an image processing apparatus capable of correcting the influence of dot overlap on the density of the output image.

In order to achieve the above objective, the present invention provides an image processing apparatus which implements the binary-coding process for the image data based on the error diffusion technique thereby to determine the generation of a dot at each pixel position of the image data, wherein the error value for a pixel under process used in the error diffusion technique is modified by a correction value which depends on the dot generation pattern that has already been determined for pixels which surround the pixel under process.

DESCRIPTION OF THE PREFERRED EMBODIMENTS

The principle of this invention will be explained with reference to FIGS. 1A and 1B and FIGS. 2A to 2H.

Figure 1A:
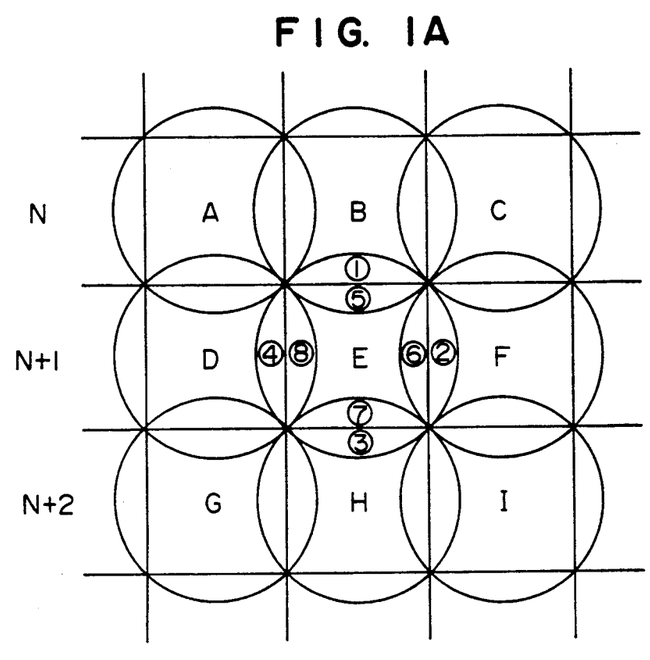
FIGS. 1A, 1B and 1C are diagrams used to explain the principle of this invention.

In FIG. 1A, indicated by A through I are nine square pixels, and a dot (shown by a circle) having a size which completely includes each pixel is generated on the theoretical position of each pixel. Accordingly, actually generated dots overlap each other.

Figure 2A:
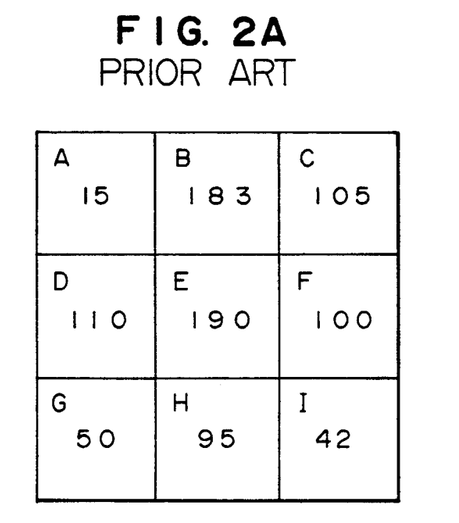
FIGS. 2A through 2H are diagrams used to explain the principle of the conventional error diffusion technique.

First, the principle of the binary-coding process based on the error diffusion technique will be explained. The following explanation is based on the assumption that each dot has an error which diffuses by 40% toward the rightward direction, by 30% toward the downward direction, and by 30% toward the down-rightward direction. For example, the pixel A has an error which diffuses by 40% into the pixel B and by 30% into each of the pixels D and E. Each pixel has a density or shade represented by one of 1–255 tone levels as shown in FIG. 2A, and the tone value undergoes binary-coding with a threshold value of "127" as an example in the following explanation.

Figure 2B:
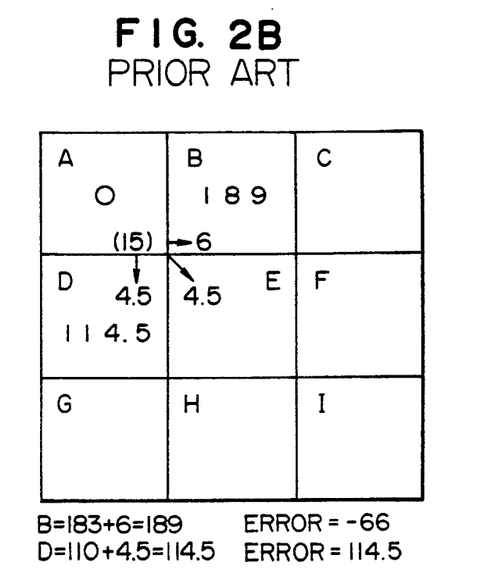
Figure 2C:
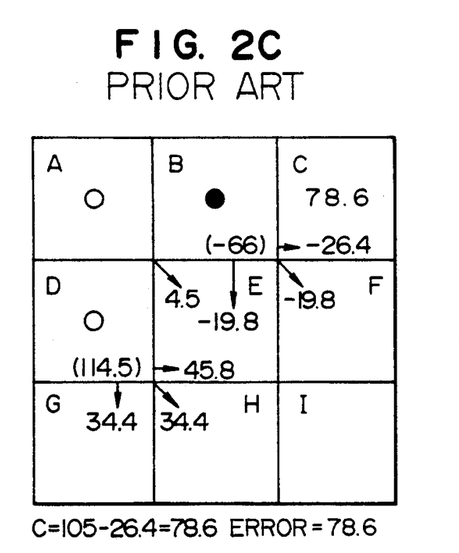
Figure 2D:
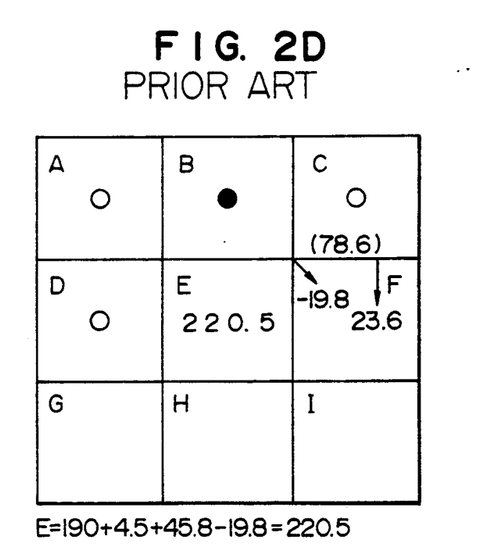
Figure 2E:
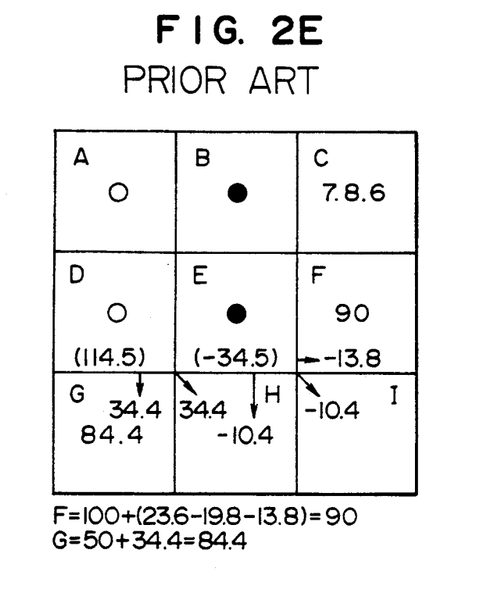
Figure 2F:
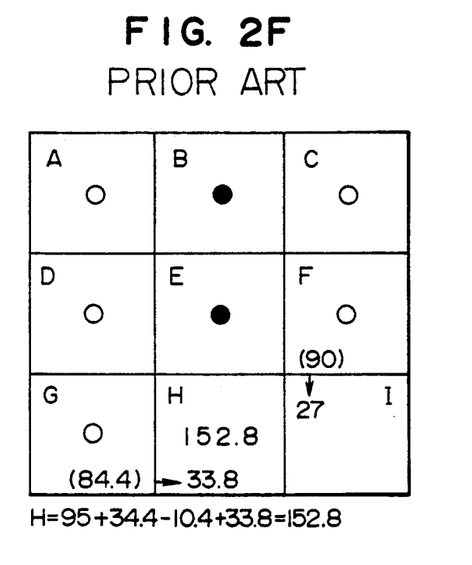
Figure 2G:
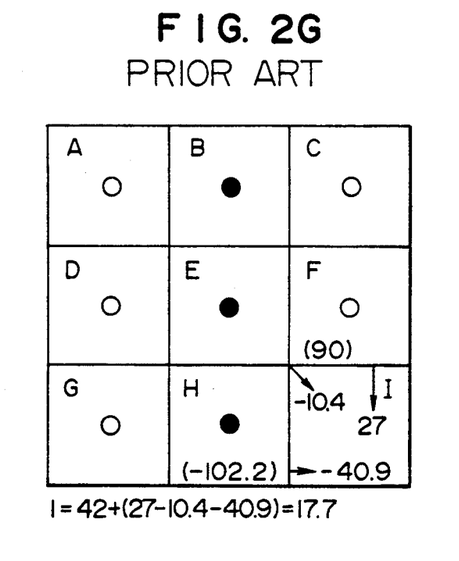
Figure 2H:
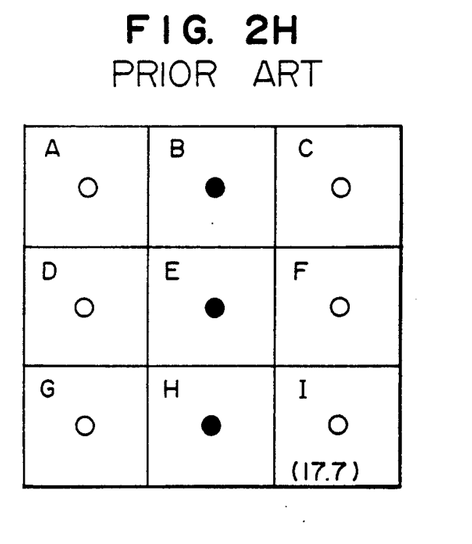

When the pixel A has a tone value of 15, it is binary-coded with the threshold value 127 to a binary value 0 (dot is not printed), so that 40% of the difference (15–0), i.e., +6, diffuses into the pixel B and 30% of the difference, i.e., +4.5, diffuses into each of the pixels D and E (see FIG. 2B). As a result, the tone value 183 of the pixel B is modified by the error +6 diffused from the pixel A to a tone value of 189. The modified tone value 189 is binary-coded with the threshold value 127 to a binary value 1 (dot is printed). In FIG. 2B, the binary-coded value 1 is indicated by a black circle, and the binary-coded value 0 is indicated by a white circle. The pixel B has an error after binary-coding corresponding to a difference, i.e. −66, between the modified tone value and the tone value 255 in the case of dot printing. Of the error −66, −26.4 diffuses into the pixel C, and −19.8 into each of the pixels E and F (see FIG. 2C). Similarly, when the pixels C and D are reproduced, the pixel E has a +4.5 diffusion from the pixel A, −19.8 diffusion from the pixel B, and +45.8 diffusion from the pixel D, resulting in a tone value of: 190+(4.5−19.8+45.8)=220.5

The tone value 220.5 is binary-coded with the threshold value 127 to a binary value 1. The pixel E has an error after binary-coding of −34.5. In this manner, the tone value modification, binary-coding and error diffusion are carried out for all pixels as shown in FIGS. 2A through 2H.

Next, the principle of dot processing according to the present invention will be explained.

In FIG. 1A, ①through ④ indicate those areas of the dot of pixel E which overlap with the pixels B, F, H and D, respectively, and ⑤ through ⑧ indicate respective areas of the dots of pixels B, F, H and D each of which overlap with the pixel E.

Figure 1B:
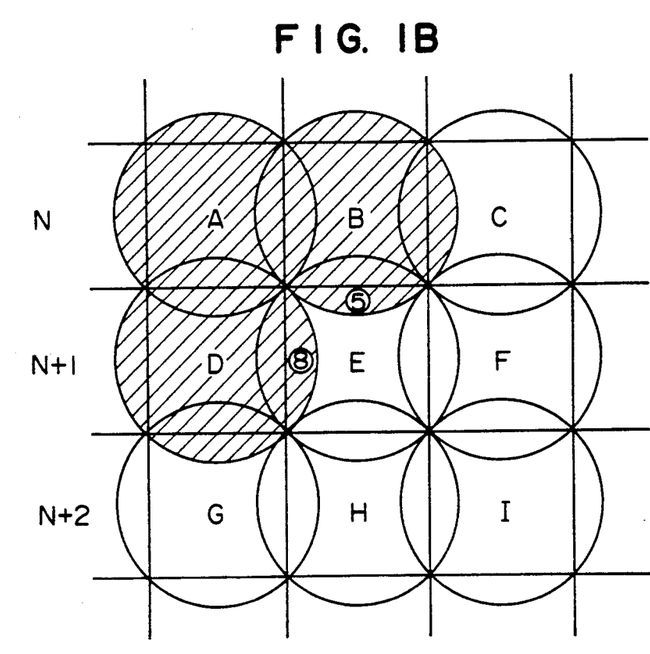

The pixel E is processed under a condition that the dots for the pixels A, B and D are generated as shown in FIG. 1B.

When the tone value of the pixel E, including the error diffusion components from the pixels A, B and D, respectively, is smaller than the threshold value 127 and thus no dot is generated for the pixel E, the pixel E is actually shaded partially by the jut-out areas ⑤ and ⑥ of the dots B and D. Accordingly, the pixel E needs to have a modification of error for the tone value P, which would be taken if the jut-out areas ⑤ and ⑧ are neglected, by assuming that a dot has been generated partially, so as to reduce the value P. That is, a new error value P' obtained by subtracting a correction value α from the tone value P is diffused into the pixels F, H and I.

For the simplicity of explanation, it is assumed that each jut-out area has a tone value of 32 which is about ⅛ of the maximum tone value 255, and the correction value α to be added to P is 32 in the case of one jut-out area involved and 64 in the case of two jut-out areas. For example, if the pixel E has a tone value P of 100, then P′ = 100 − 32 − 32 = 36 is diffused as an error of the pixel E into the adjacent pixels.

Figure 1C:
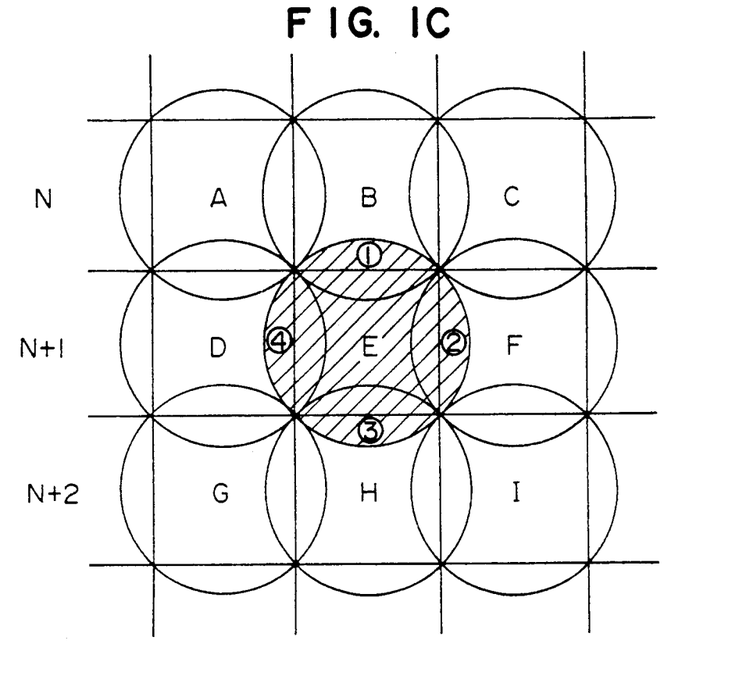

The pixel E is processed under a condition that no dot is generated in any of the pixels A, B and D as shown in FIG. 1C.

When a dot is generated for the pixel E, its jut-out areas ② and ③ affect the pixels F and H, as mentioned previously. The pixel E has other jut-out areas ① and ④ shading partially the pixels B and D where no dot should be present. These pixels B and D are already fixed at the time of process for the pixel E, and therefore they cannot be modified.

According to the present invention, the error is therefore, calculated on the assumption that a dot with a density or tone level higher than the normally maximum density n (e.g., tone value of $n+\beta=319$) is generated for the pixel E. Because of the generation of a dot of higher density than the usual dot, the propagated error should be smaller than in the case without consideration for the jut-out areas ① and ④. For example, when the pixel E has a tone value P of 130, an error of 130 − 255 = −189 is propagated to the adjacent pixels. How the higher density is assumed for the dot depends on the size of areas which jut-out the pixels where no dot should be present. For the purpose of simplicity, it is assumed that a dot having a tone value of $n+\beta=255+32=287$ is generated when no dot is present only for one of the pixels B and D, and a dot having a tone value of $255+32+32=319$ is generated when no dot is present for any of the pixels B and D.

The dot overlapping has been simplified in the above explanation, and the actual dot overlapping is more complicated so that correction values are determined depending on the pattern in dot overlapping. It is possible to obtain an output image having a tone distribution approximate to that of the input image by effecting one or both of the above two types of modification.

Next, the arrangement of the image processing apparatus which puts the foregoing principle into practice will be explained.

Figure 3:
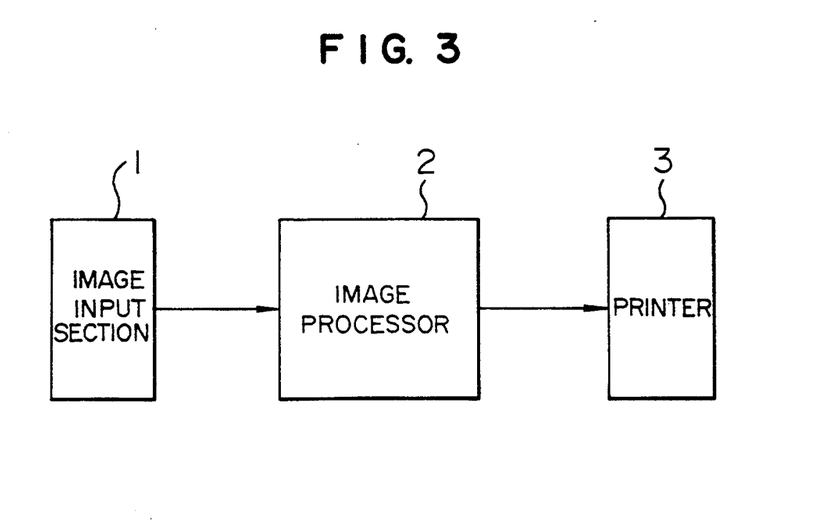
FIG. 3 is a block diagram showing the basic arrangement of an embodiment of the present invention image processing apparatus.

FIG. 3 is a block diagram showing the basic arrangement of the image processing apparatus according to one embodiment of this invention.

Image data entered through an image input device 1 which comprises an image reader, digitizer, and the like undergoes the binary-coding process according to this invention in an image processor 2, and the processed data is delivered to a printer 3.

Figure 4:
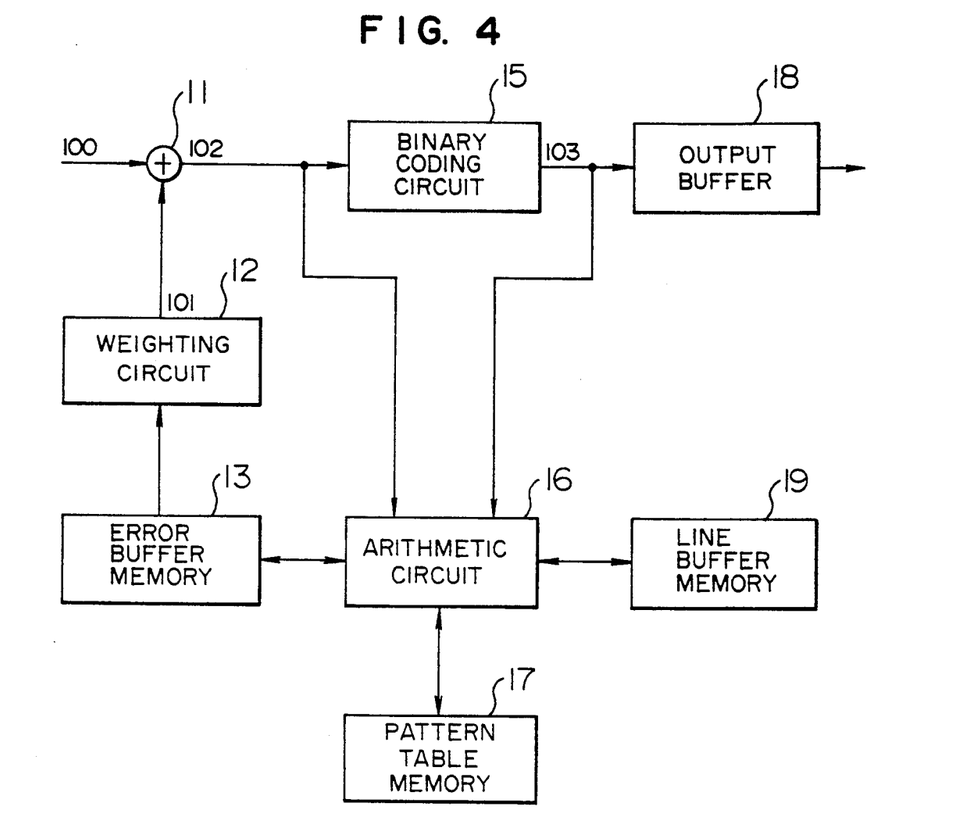
FIG. 4 is a block diagram showing the detailed arrangement of the image processor shown in FIG. 3.

FIG. 4 is a block diagram showing the principal arrangement of the image processor 2 in FIG. 3. The image processor 2 comprises an adder 11, a weighting circuit 12, an error buffer memory 13, a binary-coding circuit 15, an arithmetic circuit 16, a pattern table memory 17, an output buffer 18, and a line buffer 19.

Image data 100 is fed to the adder 11 on a pixel-by-pixel basis. The adder 11 also receives, through the weighting circuit 12, an error value stored in the error buffer memory 13.

In the error buffer memory 13, error values which have been obtained based on the aforementioned error diffusion technique are stored in correspondence to all pixels of the input image. In processing a pixel, the error values of the adjacent pixels are read out of the error buffer memory 13. The error value which has been read out is multiplied by a normalized factor which is obtained by normalizing a preset factor which is preset depending on the positional relation with the pixel under process. For example, in the example of FIG. 2, the weighting circuit 12 produces a correcting value which is the sum of a 40% error of the leftward pixel, a 30% error of the up-leftward pixel, and a 30% error of the upward pixel. The resultant correction value 101 is added to the input image data 100 by the adder 11.

The modified data 102 from the adder 11 is entered to the binary-coding circuit 15. In the binary-coding process input image data is compared with the threshold value, which is the intermediate value 127 when the input image data 100 has a tone distribution from 0 to 255 for example, and an output "0" or "1" is produced as a result of comparison. The resulting binary data 103 from the binary-coding circuit 15 is delivered to the output buffer 18.

The modified data 102 provided by the adder 11 and the binary data 103 provided by the binary-coding circuit 15 are supplied to the arithmetic circuit 16. The arithmetic circuit 16 determines the difference between the modified data 102 and the tone value "0" or "255" depending on whether the binary data 103 is "0" or "1", respectively, and writes the resulting value as an error value of that pixel into the prescribed pixel position of the error buffer memory 13. Data indicative of the value of the binary data ("0" or "1") for the processed pixel is written into the prescribed position of the line buffer memory 19.

Figure 5:
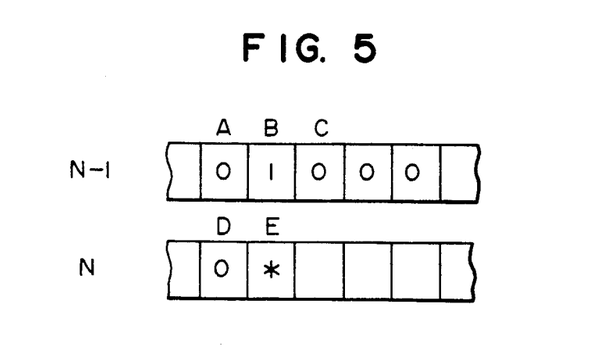
FIG. 5 is a diagram used to explain the contents of the line buffer shown in FIG. 4.

The line buffer memory 19 stores dot generation patterns for the lines which have been already determined, for example, as shown in FIG. 5. The arithmetic circuit reads a dot generation pattern of the pixels A, B, C and D adjacent to the pixel under process (indicated by a mark * in FIG. 5) out of the line buffer memory 19. The dot generation pattern for the pixels A, B, C and D is represented by, for example, (A, B, C, D) = (0, 1, 0, 0), where "1" indicates that a dot was generated, and "0" indicates that no dot was generated.

Data of the pixel under process and the adjacent pixels are read out of the line buffer memory 19, and these data are compared with patterns stored in the pattern table memory 17, from which a correction value of the matched pattern is read out. The error of the pixel under process stored in the error buffer memory 13 is modified by the correction value, and the result is stored again in the error buffer memory 13.

For example, in processing the pixel E, when its binary data is "0", the first modification described in the paragraph of principle is executed. Namely, the correction value, which is −32 in case where only one of the pixels B and C is "1" or −64 in case both are "1", is added to the error value stored in the error buffer memory 13, and the result is stored again in the error buffer memory 13. Although the pixel E is affected by dot overlapping with only dots B and D in this embodiment as shown in FIG. 1A, the patterns to be stored in the pattern table memory 17 should be more complex when the diameter of each dot is much larger, as will be explained later.

When the pixel E has a binary data of "0", the second modification described in the paragraph of principle is executed. Namely, the correction value is −32 in case when only one of the pixels B and D is "1" on the assumption that a dot was generated with a density higher by 32, or −64 in case both are "1" on the assumption that a dot was generated with a density higher by 64. The correction value is added to the error value stored in the error buffer memory 13, and the result is stored again in the error buffer memory 13. Also, in the case of the binary data of "1", the patterns to be stored in the pattern table memory 17 should be more complex when the diameter of each dot is much larger. It is enough for the line buffer memory 19 to have a capacity for two lines provided that the dot diameter is smaller than three times the pitch of dot generation.

The present invention has been explained with respect to its specific embodiment. However, this invention is not limited to the foregoing embodiment, but instead various variations are possible based on the technical concept of the invention.

For example, if pixels and dots have dimensional and positional relations as shown in FIG. 1, the dot generated for the pixel E does not affect the pixels A and C, and therefore the pixel E may be processed without the consideration of these adjacent pixels. On the other hand, when the dot size is so much greater relative to the pixel that the dot affects pixels on the second row, each pixel should be processed in consideration of all these pixels.

In the foregoing embodiment, the weighting circuit 12 can be eliminated by arranging the apparatus such that when the diffusion error is modified by the weighting circuit and written into the error buffer memory 13, the error stored in the diffusion destination address is modified in advance with a new diffusion error corrected by a predetermined weight.

When dot overlap extends to more remote periphery, as shown in FIG. 6, the same result is attained by diffusing errors modified by values with proper weights to respective overlap areas. An embodiment of this case will be explained hereinafter.

Figure 6A:
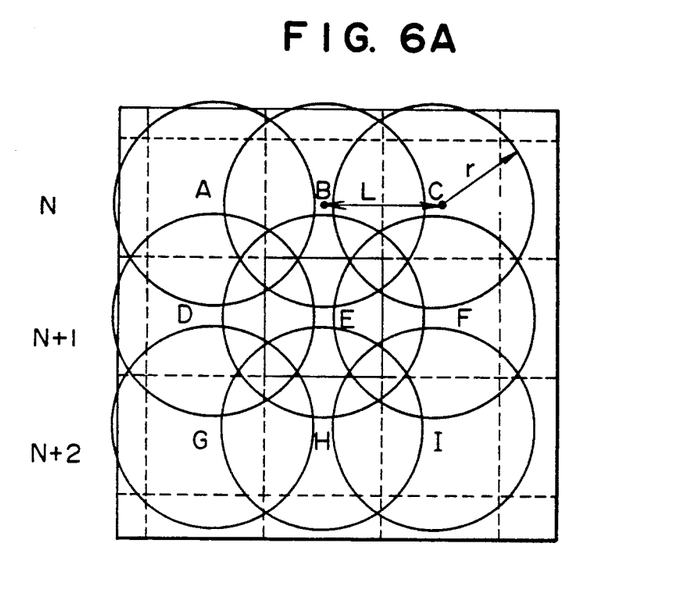
FIGS. 6A and 6B are diagrams used to explain another embodiment of this invention.
Figure 8:
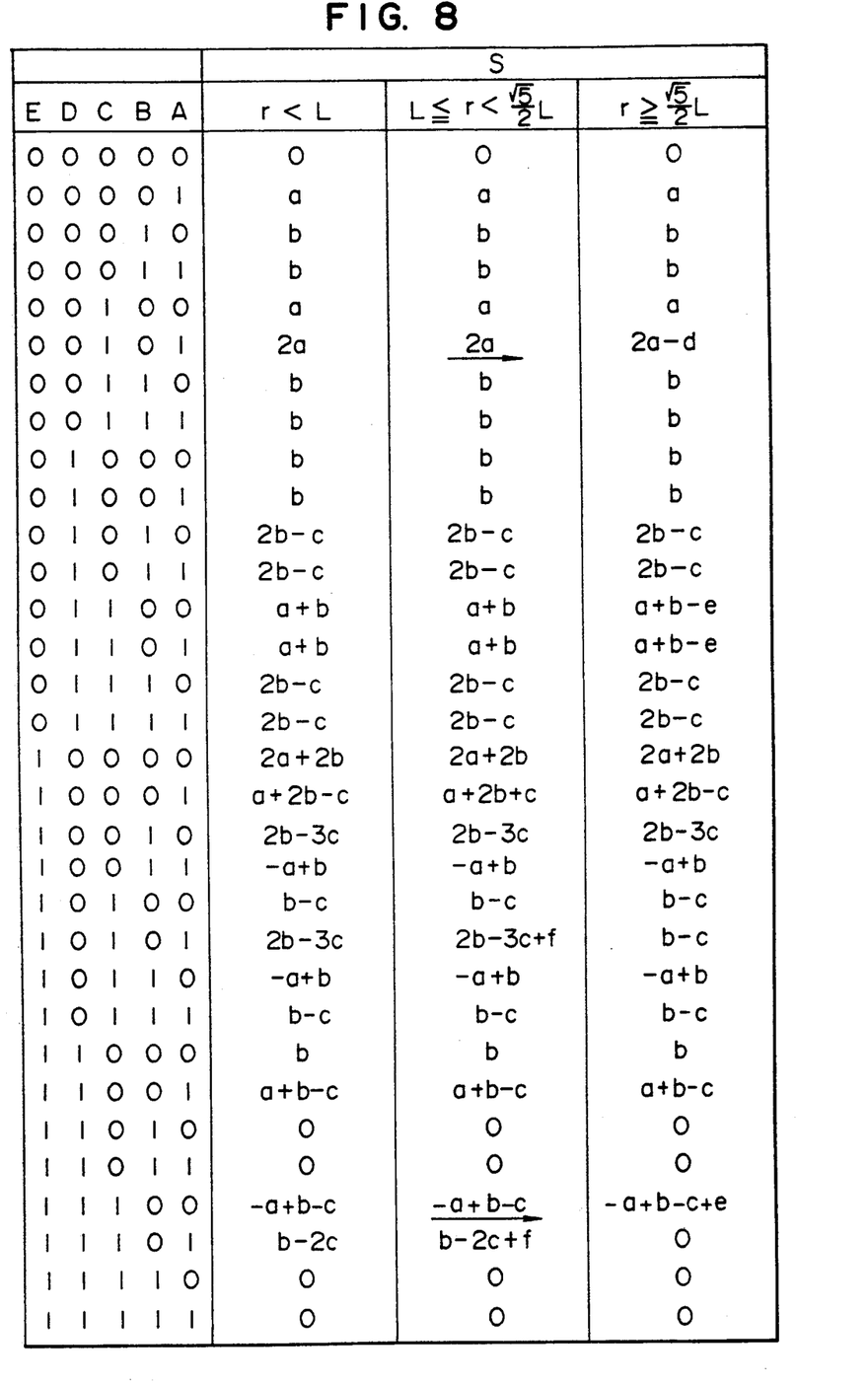
FIG. 8 is a table listing the relation between the presence or absence of neighboring dots and the total overlap area attributable to the dots.

In the foregoing embodiment, explanation has been made of a case where the circular dot has a radius r equal to the radius of the circle corresponding to a theoretical dot which is inscribed in a square having a side length of L, so that overlapping with adjacent dots is minimized. If there exist no-overlapping areas between the circular dots, white spots may appear in the area which should be shaded in black. In order to avoid such white spots, the practical electrostatic printing apparatus is designed to have enlarged overlap sections of dots as shown in FIG. 6A. There are six modes in pattern of overlapping as shown by a through f in FIGS. 7A through 7D, and the relation of two adjacent dots can be expressed as a combination of selected ones of the six patterns. As to the pixel A, as shown in FIG. 6A, for which the dot generation is to be determined, the total area S of the jut-out areas of the adjacent pixels A, B, C and D into the pixel E depends on whether a dot is generated or not in each of the pixels A, B, C and D, as shown in the Table of FIG. 8 (where generation of a dot is indicated by "1" and no-generation is indicated by "0"). In the table, the leftmost of the column S indicates a case where the dot radius r is smaller than the distance L between the centers of the adjacent two dots and each of the center and the rightmost of the column S indicates a case where the dot radius r is equal to or larger than the distance L.

Figure 6B:
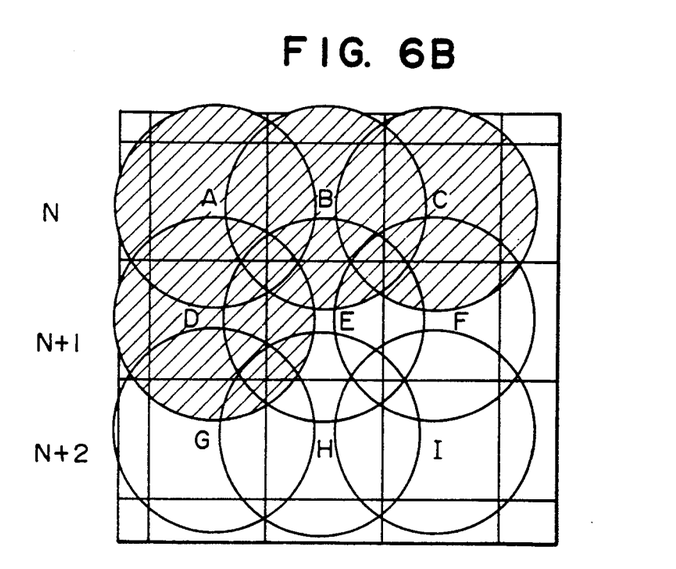
Figure 7A:
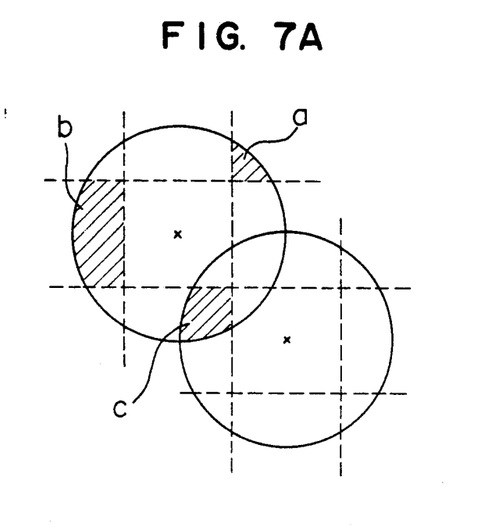
FIGS. 7A, 7B, 7C and 7D are diagrams used to explain the overlap of dots.
Figure 7B:
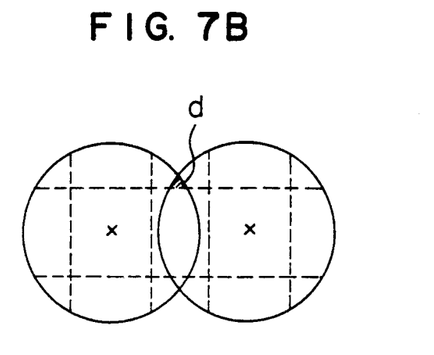
Figure 7C:
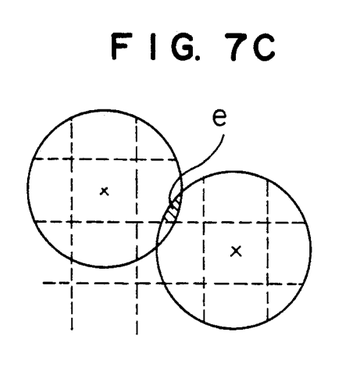
Figure 7D:
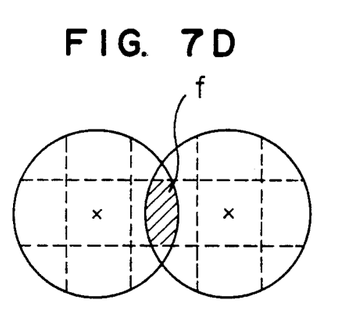

For example, when the dots A, B, C and D are all "1" as shown in FIG. 6B and the dot E is not to be generated, there exist jut-out areas from the dots B and D represented by b+b and a common area c which is common to the jut-out areas from the dots B and D, resulting in the total area S being 2b−c, as shown in the item "0 1 0 1 1" in the table.

Individual jut-out areas denoted by a through f are calculated by the following expressions (1) through (6) as a function of the dot radius r and center-to-center distance L of the dots. The total area S of jut-out areas is converted into the value of density by the expression (7) as a function of the ratio of the area S to the dot area, and diffused to the rightward, down-leftward, downward and down-rightward directions in prescribed proportions based on error diffusion.

$$a = \pi r^2 \times \frac{\theta_1}{180} - \frac{L}{2} \sqrt{r^2 - \left(\frac{L}{2}\right)^2} - \frac{1}{4}(\pi r^2 - L^2) \quad (1)$$

$$\text{where, } \theta_1 = \cos^{-1}\left(\frac{L/2}{r}\right)$$

$$b = -\pi r^2 \times \frac{\theta_1}{180} + \frac{L}{2} \sqrt{r^2 - \left(\frac{L}{2}\right)^2} - \frac{1}{2}(\pi r^2 - L^2) \quad (2)$$

$$c = \pi r^2 \times \frac{\theta_2}{180} - \frac{\sqrt{2}}{2} L \sqrt{r^2 - \left(\frac{\sqrt{2}}{2}L\right)^2} - a \quad (3)$$

$$\text{where, } \theta_2 = \cos^{-1}\left(\frac{\frac{\sqrt{2}}{2}L}{r}\right)$$

$$d = \pi r^2 \times \frac{\theta_4}{180} - L\sqrt{r^2 - L^2} + \frac{1}{2} \times L^2 - b \quad (4)$$

$$\text{where, } \theta_4 = \cos^{-1}\left(\frac{L}{r}\right)$$

$$e = \pi r^2 \times \frac{\theta_5}{180} - \frac{\sqrt{5}}{2} L \sqrt{r^2 - \left(\frac{\sqrt{5}}{2} L\right)^2} \quad (5)$$

$$\text{where, } \theta_5 = \cos^{-1}\left(\frac{\frac{\sqrt{5}}{2} L}{r}\right)$$

$$f = 2b - L^2 \quad (6)$$

$$255 \times S/L^2 \quad (7)$$

Although the above explanation has been made solely of a case using circular dots, the present invention is also applicable to a case using ellipsoidal dots which may be generated by an electrostatic printing head of nib shape by modification of the expressions correspondingly to the ellipsoidal dots.

We claim:

1. An image processing apparatus comprising;
an error memory for storing error data as diffused;
adding means for adding the error data as diffused from adjacent pixels read out of said error memory to input multi-tone image data;
binary coding means for comparing the multi-tone image data supplied from said adding means with a predetermined threshold level thereby to produce binary data;
error calculation means for outputting, as error data, a difference between the input data to said binary coding means and a tone value n obtained when a dot is generated or a tone value O obtained when no dot is generated and modifying the error data depending on a jut-out area from the adjacent pixels; and
a jut-out pattern memory for storing correction factors in correspondence to patterns of overlapping of the adjacent dots.

2. An image processing apparatus according to claim 1, wherein said jut-out pattern memory stores, as a correction factor, the ratio of a total area of jut-out areas from the adjacent pixels to a theoretical pixel area.

3. An image processing apparatus comprising:
an error memory for storing error data as diffused;
adding means for adding the error data as diffused from adjacent pixels read out of said error memory to input multi-tone image data;
binary coding means for comparing the multi-tone image data supplied from said adding means with a predetermined threshold level thereby to produce binary data;
error calculation means for outputting, as error data, a difference between the input data to said binary coding means and a tone value n obtained when a dot is generated or a tone value O obtained when no dot is generated and modifying the error data depending on a jut-out area from the adjacent pixels; and
wherein said error calculation means calculates the error data such that, when a dot is generated, and the dot includes a jut-out area into the adjacent pixel, for which it is already determined to generate no dot, the error data is calculated on an assumption that a dot has a tone level $n+\beta$ higher than the tone level n expected, when the dot is generated.

4. An image processing apparatus comprising:
an error memory for storing error data as diffused;
adding means for adding the error data as diffused from adjacent pixels read out of said error memory to input multi-tone image data;
binary coding means for comparing the multi-tone image data supplied from said adding means with a predetermined threshold level thereby to produce binary data;
error calculation means for outputting, as error data, a difference between the input data to said binary coding means and a tone value n obtained when a dot is generated or a tone value O obtained when no dot is generated and modifying the error data depending on a jut-out area from the adjacent pixels; and
wherein said error calculation means modifies the error data, when no dot is generated, and a dot of the adjacent pixel, for which it is already determined to generate the dot, juts out therein, by subtracting from the error data a value corresponding to the jut-out area of the dot for the adjacent pixel.

5. An image processing apparatus comprising:
an error memory for storing error data to be diffused;
correcting means for correcting input multi-tone image data for each pixel by the error data to be diffused from an adjacent pixel as stored in the error memory, thereby producing a corrected multi-tone image data;
binary coding means for comparing the corrected multi-tone image data with a predetermined threshold level thereby to produce binary data for the pixel; and
error calculation means for calculating the error data for each pixel, as a difference between the corrected multi-tone image data for the pixel and a predetermined first tone value when a dot is to be generated for the pixel or a predetermined second tone value when no dot is to be generated for the pixel, said error calculation means including means for substituting said first tone value by a predetermined third tone value higher than said first tone value for calculation of the error data, when a dot is to be generated for the pixel and the dot includes a jut-out area into an adjacent pixel for which it is already determined to generate no dot.

6. An image processing apparatus comprising:
an error memory for storing error data to be diffused;
correcting means for correcting input multi-tone image data for each pixel by the error data to be diffused from an adjacent pixel as stored in the error memory, thereby producing a corrected multi-tone image data;
binary coding means for comparing the corrected multi-tone image data with a predetermined threshold level thereby to produce binary data for the pixel; and
error calculation means for calculating the error data for each pixel, as a difference between the corrected multi-tone image data for the pixel and a predetermined first tone value when a dot is to be generated for the pixel or a predetermined second tone value when no dot is to be generated for the pixel, said error calculation means including means for modifying the corrected multi-tone image data before calculation of the error data, when no dot is to be generated for the pixel and a dot of an adjacent pixel, for which it is already determined to generate the dot, includes a jut-out area jutting-out into the pixel, by subtracting a value corresponding to the jut-out area of the dot of the adjacent pixel from the corrected multi-tone image data.

7. An image processing apparatus comprising:

an error memory for storing error data to be diffused;

correcting means for correcting input multi-tone image data for each pixel by the error data to be diffused from an adjacent pixel as stored in the error memory, thereby producing a corrected multi-tone image data;

binary coding means for comparing the corrected multi-tone image data with a predetermined threshold level thereby to produce binary data for the pixel; and error calculation means for calculating the error data for each pixel, as a difference between the corrected multi-tone image data for the pixel and a predetermined first tone value when a dot is to be generated for the pixel or a predetermined second tone value when no dot is to be generated for the pixel, wherein said first tone value is substituted by a predetermined third tone value higher than said first tone value before calculation of the error data when the dot to be generated for the pixel includes a jut-out area into an adjacent pixel, for which it is already determined to generate no dot, and the corrected multi-tone image data is modified before calculation of the error data, when no dot is to be generated for the pixel and a dot of an adjacent pixel, for which is already determined to generate the dot, includes a jut-out area jutting-out into the pixel, by subtracting a value corresponding to the jut-out area of the dot of the adjacent pixel from the corrected multi-tone image data.

* * * * *